June 16, 1953 J. C. MOUZON 2,642,530
CONTROL APPARATUS
Filed April 3, 1948 3 Sheets-Sheet 1

INVENTOR.
JAMES C. MOUZON
BY
ATTORNEY.

June 16, 1953     J. C. MOUZON     2,642,530
CONTROL APPARATUS Filed April 3, 1948     3 Sheets-Sheet 2

*INVENTOR.*
JAMES C. MOUZON

BY

ATTORNEY.

June 16, 1953 J. C. MOUZON 2,642,530
CONTROL APPARATUS

Filed April 3, 1948 3 Sheets-Sheet 3

*INVENTOR.*
JAMES C. MOUZON

BY
Arthur H. Swanson
ATTORNEY.

Patented June 16, 1953

2,642,530

UNITED STATES PATENT OFFICE 2,642,530

CONTROL APPARATUS

James C. Mouzon, Wyndmoor, Pa., assignor, by mesne assignments, to Minneapolis-Honeywell Regulator Company, Minneapolis, Minn., a corporation of Delaware Application April 3, 1948, Serial No. 18,817

4 Claims. (Cl. 250—36)

The present invention relates to electronic oscillators and particularly high frequency oscillators, and to control systems and apparatus of the type in which control actions are effected through an electronic valve and associated means by which said valve is caused to operate as an oscillator, or not to so operate, accordingly as a controlling quantity or condition has one or another value. The controlling quantity or condition may be a temperature, pressure, velocity, weight or other condition adapted to give movement to a control element on a small change in the value of the controlling quantity or condition.

One general object of the invention is to provide an improved high frequency oscillator adapted for use in control circuits and in circuits other than control circuits, in which the use of a high frequency oscillator is desirable. A more specific object of the invention is to provide a novel oscillator characterized by its provisions for maintaining the control grid of the oscillating valve at the ground potential for A. C. operations, and for its provisions for obtaining the desired oscillating action of the valve by inductively coupling the valve cathode to the valve anode or a valve electrode other than the control grid of the valve. In a form of my novel oscillator especially desirable for various purposes, the cathode and anode of the oscillator are included in separate tuned circuit networks.

Another general object of the present invention is to provide an improved control system and improved apparatus of the above mentioned type and of the known form in which an electronic valve is caused to oscillate, or to operate without oscillation, by the adjustment of a vane or analogous control element which by its adjustment varies a regenerative or feedback connection between the input and output circuits of the valve to thereby establish and interrupt operation of the valve as a high frequency oscillator.

A primary object of the present invention is to increase the sensitivity with which an oscillating control system of the above-mentioned type and form is responsive to adjustments of the control element so as to insure stable operation with or without oscillation as a result of a predetermined and very small adjustment of said element. In the preferred form of such a control system, the control element is a vane movable between two induction coils to vary their mutual inductance. Another primary object of the present invention is to increase the sensitivity with which an oscillating control system of said type and form responds to adjustments of the mutual inductance varying element, so as to insure stable operation, with or without oscillation, as a result of a predetermined and very small adjustment of said element.

A specific object of the present invention is to make the oscillatory condition of the oscillating circuit substantially independent of all conditions tending to produce or interrupt its oscillation other than the adjustment of the controlling vane. More specific objects of the invention are to provide a control system of the above mentioned type and form, in which the potential of the control grid of the electronic valve is maintained substantially constant and free from any tendency to be swung by the capacitive coupling of the anode and grid within the tube; and in which the oscillating valve may be a simple triode; and in which the control grid of the valve forms an effective shield preventing the capacitive coupling of the anode and cathode of the valve within the tube.

The maintenance of the control grid potential constant and free from oscillation due to interelectrode forces in the valve, insures the attainment of the more generally stated objects of the invention, and in the preferred form of the invention, is insured by a ground connection through which the control grid is maintained at the ground potential for A. C. operation, and by the connection of the cathode to ground through one of the two inductances whose mutual inductance is varied to cause or prevent oscillation. In the preferred practical form of the invention, the control grid of the valve is connected to ground through a resistor and by-pass condenser and the circuit constants are so chosen as to obtain an ultra-high oscillation frequency, such, for example, as a frequency of 30 megacycles per second.

A specific object of the invention attained with the control grid and cathode connected to ground as described, is the generation of a degenerative voltage by the high frequency oscillating current flowing through the cathode-ground connection. That voltage makes the control grid more negative relative to the cathode than it would be otherwise, and directly contributes to the sharpness of the system response adjustment of the controlling vane.

The various features of novelty which characterize my invention are pointed out with particularity in the claims annexed to, and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
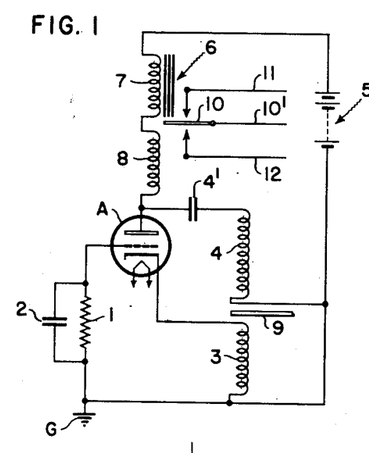
Fig. 1 is a circuit diagram.

In the embodiment of the invention shown diagrammatically in Fig. 1 by way of example, A designates an electronic tube enclosing a triode valve having its control electrode or grid connected to ground at G. As shown, the ground connection comprises a resistance 1 and a by-pass condenser 2 in parallel therewith. The cathode of the valve A is connected to ground by an inductance coil 3. The anode of the valve A is connected to ground through an inductance coil 4 and a condenser 4' in series therewith. Distributed capacitance between the turns of coil 4 is sufficient in the embodiment of the invention herein illustrated to provide the necessary tuning of coil 4, but it will be understood that a separate condenser connected in shunt to coil 4 may be provided for this purpose, if desired. The plate circuit of the valve includes a voltage source 5 which ordinarily may well be a transformer secondary winding, but is shown in Fig. 1 as a D. C. battery. The voltage source 5 is connected to the cathode of the valve A through the winding 3, and is connected to the anode of the valve A through the inductive winding 7 of a relay device 6 and a choke coil 8 in series with the winding 7.

Figure 2:
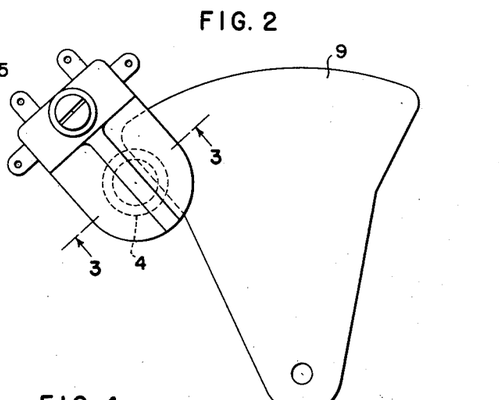
Fig. 2 is a view showing the form and relative arrangement of one of the inductance coils and the controlling vane shown in Fig. 1.
Figure 3:
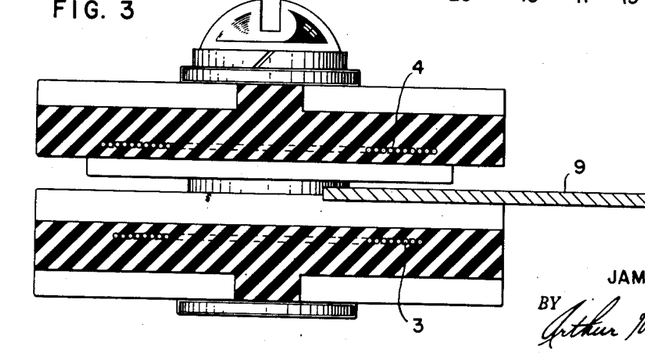
Fig. 3 is a section through the two inductance coils and vane, taken on the plane of the line 3—3 of Fig. 2.

As shown, the coils 3 and 4 are separated by a space adapted to receive a movable vane element 9. The latter may be in the form of a small plate of aluminum, copper or other good conducting metal, with its plane transverse to the common axis of the coils 3 and 4. The vane 9 is movable in the direction of its plane between a position in which it is interposed between the two coils 3 and 4 and so reduces their mutual inductance as to prevent oscillation of the tube A, and a second position in which the coils have sufficient mutual inductance to maintain the tube in oscillation. While the coils 3 and 4 may taken various forms, they are advantageously coaxial, flat or pancake coils, as shown in Figs. 2 and 3, each comprising a conductor wound to form a flat spiral, having for example, five to ten, or more, convolutions.

As those skilled in the art will understood, with the same plate circuit voltage supplied by the source 5, the current flow through the winding 7 of the relay 6 is substantially smaller when the tube A is oscillating, than when it is not oscillating. The relay may thus be operatively energized or deenergized by preventing or maintaining the oscillation of the tube. The energization and deenergization of the relay 6 may produce opposing control actions in various ways. As diagrammatically shown, when the relay 6 is energized its pivoted armature contact 10 connects a relay conductor 10' to a second relay conductor 11. When the relay is denergized, the contact 10 moves to connect the conductor 10' to a third relay conductor 12.

The elements and constants of the circuits shown in Fig. 1 may have different forms and values. In one practically operable form of the apparatus illustrated in Fig. 1, the tube A is a commercially available type 6J5 tube, the resistance 1 is of .5 megohm, the capacity of condenser 2 is .015 microfarad, the coils 3 and 4 are pancake coils formed of No. 31 B and S copper wire. As shown, the coil 3 has 7½ turns and the coil 4 has 9½ turns. In outside diameter the coil 3 is slightly smaller than the coil 4, but in the case of each coil the outside diameter may ordinarily be between ½ and ¾ of an inch. The vane receiving space between the coils 3 and 4 has a thickness of ⅛ of an inch. The sheet metal vane 9 is $\frac{1}{16}$ of an inch thick. The condenser 4' has a capacity of 100 mmfd. The current source 5 has a D. C. voltage of 250 volts. The choke coil 8 may have an inductance of 1 mh.

Apparatus having the constants just specified will oscillate with a frequency of about 30 megacycles per second, when the vane 9 does not significantly reduce the mutual inductance of the coils 3 and 4. As all those skilled in the art understand, apparatus of the form shown is adapted to oscillate when the mutual inductance of the coils 3 and 4 is sufficient to insure a small feedback of energy from the plate or output circuit to the input circuit of the valve A.

With the dimensions and values stated, a movement of the portion of vane 9 within the space between the coils 3 and 4 and nearest to the common axis of said coils through a distance of no more than .002 of an inch toward and away from said common axis is sufficient to interrupt or produce oscillation.

In the normal contemplated operation of apparatus of the type and form shown in the drawings and hereinbefore described, the vane 9 is connected to a controlling device of a type suitable to the conditions of use. For example, in the use of the invention to control the temperature of an electric furnace, the pressure in a thermometer bulb subjected to the furnace temperature may be transmitted to a Bourdon tube or bellows mechanically connected to the vane 9 so as to cause or prevent oscillation of the tube A accordingly as the furnace temperature is, or is not, as high as a predetermined desirable value. In such case, deenergization of the relay 6 may operate through the relay conductors 10' and 12 to cut off or reduce the supply of heat to the electric furnace while the tube A is oscillating, and when the oscillation of the tube is interrupted, the relay 6 will be energized and may operate through the relay conductors 10' and 11 to restore or increase the supply of heat to the furnace.

As previously indicated, the operation of apparatus of the type shown in the accompanying drawing is characterized by the sharpness of its response to a change in a position of the controlling vane 9. The movement of .002 of an inch required to cause or prevent oscillation of the tube A is about one-fifth as great as the movement required to cause or prevent oscillation in any oscillator controller of conventional type heretofore put into use. The increased sensitivity of an oscillator embodying the present invention is due, I believe, to the exclusion from it of all factors tending to produce tube oscillation, other than the regulable mutual inductance of the coils 3 and 4 included in the cathode and anode circuits.

With the control grid maintained at a fixed potential, the capacitive coupling within the tube of the plate and control grid cannot vary the control grid potential and thereby produce tube oscillation. Furthermore, with the control grid maintained at a fixed potential, and particularly when grounded for A. C. operation, it acts as a shield between the plate and cathode of the tube to prevent tube oscillation as a result of the capacitive coupling within the tube of the anode and cathode. In the operation of the conventional oscillator of the prior art, the oscillator performance is invariably dependent on interelectrode forces in the oscillating valve. In the well known conventional Hartley oscillator, for example, when operating at frequencies of the order of 30 megacycles with an ordinary triode oscillator tube, oscillation will ordinarily be maintained by interelectrode tube capacitance, even though the plate and grid inductance coils of that oscillator are separated so that they have no mutual inductance coupling. In consequence, such an oscillator can not be made subject to sharp vane control.

While such a prior oscillator can be made subject to reasonably sharp vane control by the replacement of a triode by a pentode tube in which the plate-control grid capacitance is minimized by the screen grid, the use of the pentode tube requires a source of screen grid voltage and a screen grid by-pass condenser. With the control grid subjected to a fixed potential in accordance with the present invention, desirable oscillation characteristics heretofore only approximated by the use of a tube such as a pentode having a screen grid, are obtainable with a simple, commercially available, triode tube.

An important characteristic of the invention disclosed herein is the inherent capacity of the apparatus to produce a degenerative voltage across the cathode inductance coil 3 due to the relatively large potential drop (IZ) in the coil 3 when radio frequency current is flowing through the coil and its impedance is correspondingly high. Such degenerative voltage is not produced in the operation of the conventional prior art oscillators, since there is not radio frequency current flow between grid and cathode in the circuits of those oscillators as there is in the circuit shown in Fig. 1. The degenerative voltage thus produced is sufficient to prevent significant fluctuation in grid potential due to the inductance in the grid circuit, which in operation at very high frequencies, is furnished by the lead connecting the control grid to ground, even though that lead be quite short. With such inductance in the grid circuit and without the above mentioned degenerative voltage the plate-grid capacitance of the tube A would cause oscillation, as in a tuned plate-tuned grid oscillator, independent of any coupling between the grid and plate coils 3 and 4.

The degenerative voltage produced across the coil 3 has a further advantage in preventing the oscillation tendency, experienced with prior oscillators, due to plate-cathode capacitance under certain operating conditions.

An additional reason why an oscillator constructed in accordance with the present invention is more sensitive to vane movement than are conventional oscillators of the prior art, is found in the fact that with the present invention, both the degenerative radio frequency voltage drop and the induced regenerative or feedback voltage, appear across the coil 3. Oscillation can occur therefore only when the regenerative voltage exceeds the degenerative voltage by an amount necessary to produce and sustain oscillation. In the typical prior oscillator employing an inductance coil coupling, the entire regenerative or feedback voltage supplied to the grid circuit coil by its coupling to the plate circuit appears across the grid circuit coil. There is little or no degenerative radio frequency current flow in the last mentioned coil and substantially all of the voltage across the grid circuit coil is thus induced regenerative voltage.

An understanding of the effect, on the operation of the tube A, of the degenerative voltage developed across the coil 3, when the tube is oscillating, may be facilitated by a comparison of the performance of the system shown in Fig. 1 hereof with that of a conventional control system oscillator of the well known magnetic feedback type, such as is shown, for example, in the Lum Patent 1,944,988 of January 30, 1934. In that conventional oscillator control system, the controlling vane is moved between, and varies the mutual inductance of, two coils. One of those coils is connected in the output circuit of the electronic valve of the system, and is commonly referred to as the plate coil, while the second coil, commonly called the grid coil, is connected in the valve input circuit. It is reasonable to assume that in such a conventional oscillator circuit, the grid coil will have twenty convolutions or turns, and that the regenerative voltage developed across the coil will be two volts when the circuit is oscillating with its normal maximum frequency, and that the movement of the vane required to interrupt the oscillation of the valve will reduce the voltage induced in the grid coil to one volt. On the foregoing assumptions, the vane adjustment required to interrupt the oscillation of the conventional system will be one producing an effect on the mutual inductance of the coils equivalent to the removal from the inducing magnetic field of ten of the twenty turns of the grid coil.

Assume also that the coil 3 of Fig. 1 is like the conventional grid coil in having twenty turns, and that a net regenerative voltage of two volts must be impressed on the control grid of the tube A to maintain oscillation with the normal maximum frequency, and that when the net regenerative voltage is reduced to one volt, no high frequency oscillation current will be generated. In such case the regenerative voltage actually induced in the coil 3 must exceed the degenerative voltage developed in the coil by two volts, or by one volt, accordingly as the tube A is, or is not, oscillating.

It is reasonable to assume that a degenerative voltage of eight volts will be developed across the coil 3 of Fig. 1 when the tube A is oscillating with the maximum normal frequency. The regenerative voltage induced in the coil 3 must then be ten volts in order that the difference may be the net regenerative voltage of two volts needed to maintain oscillation at the normal maximum frequency. To effect the reduction of the net regenerative voltage from two volts to one volt, as required to interrupt and totally eliminate the oscillation of the tube A, plainly requires a reduction in the regenerative voltage induced in the coil 3 from the ten volts to nine volts. To effect such a reduction the required vane adjustment effect must be equivalent to the removal from the inducing magnetic field created by the coil 4 of only two of the twenty turns of the coil 3. On the foregoing assumption, if the coil and vane conditions are the same in the two cases, the vane movement required to interrupt oscillation in the conventional circuit will be five times that required to interrupt oscillation with the circuit shown in Fig. 2. In actual practice oscillation at the maximum normal frequency may be established and totally eliminated in a circuit of the type shown in Fig. 1 by a vane movement of .002 of an inch, whereas the establishment and total elimination of oscillation of normal maximum frequency in conventional oscillating circuits known to me require vane movements of more than .02 of an inch.

As the foregoing explanations indicate, there is a marked difference in the relation of the vane movement to the resultant change in the relay current between a circuit of the type shown in Fig. 1 hereof, and the conventional oscillator circuits heretofore known, such, for example, as the circuit disclosed in said Lum patent. This difference is made apparent by a comparison of the curves H and I shown in Fig. 4. The last mentioned curve is a reproduction of a curve shown in the Lum patent, and the curve H is based on the actual performance of a circuit of the form shown in Fig. 1 and having the circuit element values hereinbefore stated by way of example.

Figure 4:
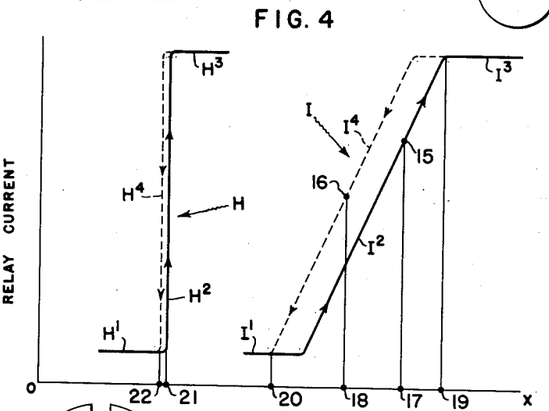
Fig. 4 is a comparative diagram illustrating the variations in the plate current of an oscillator valve produced by similar inductance coil and vane adjustments in a circuit of the character shown in Fig. 1 and in an oscillator circuit of a type heretofore conventional.

In Fig. 4, the distance between the two points of each of the hereinafter mentioned pairs of points on the horizontal line OX represents a particular vane movement, i. e., the movement of the portion of the vane edge nearest the common axis of the inductance coils as the vane is adjusted from one position to a second position. The vertical distance between points along each of the curves H and I represents changes in the corresponding relay current, i. e., that component of the plate current flowing through the valve which also passes through the relay winding in the output circuit of the valve and includes no current pulsating with the oscillation frequency.

The curves H and I are alike in that each includes vertically displaced horizontal sections H' and H³, and I' and I³, respectively. The horizontal sections of each curve are connected by two transverse sections parallel to one another. The transverse sections H² and H⁴ of the curve H are substantially vertical, whereas the sections I² and I⁴ of the curve I are inclined to the vertical at an angle slightly greater than 25°.

The horizontal portion H' of the curve H represents the relatively low value of the relay current when the vane 9 is too remote from the axis of the inductance coils 3 and 4 to have any significant effect upon the mutual inductance of those coils. The horizontal section H³ of the curve H represents the relatively high value of the relay current when the vane 9 is too close to the axis of the coils 3 and 4 to permit any oscillation of the tube A. The transverse portion H² of the curve H represents the changing value of the relay current during the very short time interval in which the oscillation action of the tube A is being terminated. The section H⁴ of the curve H represents the changing value of the relay current during the very short period in which the tube A begins to oscillate and in which the oscillation amplitude builds up to normal maximum value.

The sections I' and I³ of the curve I are like the sections H' and H³ of the curve H, in that they represent the respective steady values of the relay current when the conventional system is oscillating with normal maximum frequency, and is not oscillating at all. The section I² of the curve I represents the varying value of the relay current as the oscillation action varies from its maximum value to zero. The arrows applied to the curve sections H², H⁴, I² and I⁴ indicate the direction in which the value of the relay current is changing. The fact that the curve sections H² and H⁴ are substantially vertical, while the curve sections I² and I⁴ are definitely inclined to the vertical, evidences, and results from, the fact that with the control system shown in Fig. 1 there is an abrupt, almost instantaneous change from the oscillating to the non-oscillating condition, and from the non-oscillating to the oscillating condition, whereas in the conventional circuit whose performance is represented by the curve I, the transition between the oscillating and non-oscillating condition of the circuit proceeds gradually, and involves a definite progressive change in the amplitude of oscillation, which builds up and dies down at a rate indicated by the inclination to the vertical of the curve sections I² and I⁴.

As Fig. 4 indicates, the energization or deenergization of the relay winding 7 of Fig. 1 normally results from the movement of the vane 9 in one direction sufficient to totally interrupt oscillation of the circuit, or from an equal vane movement in the reverse direction which establishes oscillation. In the conventional circuit, however, the energization and deenergization of the relay is commonly effected as a result of a vane movement which merely reduces or increases the amplitude of oscillation and is substantially smaller than the vane movement required to effect the transition of the circuit between its oscillating and non-oscillating conditions. Thus, as is explained in the Lum patent, the relay is energized at a point 15 in the curve section I² at which the relay current is definitely smaller than it is when circuit oscillation is eliminated. Similarly, the relay is deenergized at a point 16 in the curve section I⁴ at which the relay current value is somewhat smaller than the value represented by the point 15, and is definitely higher than the low relay current value represented by the curve section I'. The points 17 and 18 on the line OX are vertically beneath the points 15 and 16, respectively, and the distance between them is a measure of the vane movement required to energize or deenergize the relay of the conventional circuit to which the curve I pertains.

The vane travel represented by the distance between the points 17 and 18 is a small fraction only of the vane movement necessary to effect the transition of the conventional circuit between its oscillation and non-oscillation conditions. The last mentioned vane movement is represented in Fig. 4 by the distance between the points 19 and 20 on the line OX, and is something like thirty times the distance between the points 21 and 22 on the line OX, which represent the travel of the vane 9 necessary to effect the transition of the circuit shown in Fig. 1 between its oscillating and non-oscillating conditions.

The distances between related pairs of points on the line OX of Fig. 4 are believed to be generally consistent with the actual performance of the two circuits referred to. In the Lum patent, the vane movement required to effect the energization and deenergization of the relay element of the circuit, is said to be "as small as 1/8" or 1/32", or less" and in Fig. 4, the vane movement represented by the distance between the points 17 and 18 is assumed to be .02 of an inch, and other distances between points on the line OX are on the same scale. Thus, the distance between the points 21 and 22 which represents a vane movement of .002" is about 1/10 of the distance between the points 17 and 18, which represents a vane movement of .02".

The fact that such energization and deenergization of the relay winding 7 of Fig. 1 is attended by the transition of the control system between its oscillating and non-oscillating condition, and is effected by a substantially smaller vane movement than is required in prior oscillators to effect the energization and deenergization of their respective relays by varying the oscillation amplitude, contributes to the stability and operational reliability of apparatus embodying the present invention. The good operating results obtained with my invention in its vane controller form appear to be dependent on four factors, one of which is degenerative voltage developed across the coil 3 when the system is oscillating. A second and highly important factor is the maintenance of the control electrode or grid of the tube A at a substantially constant potential, insofar as A. C. operation is concerned, so that the oscillation of the tube is substantially independent of all of the varying conditions of normal operation, other than the variations in the mutual inductance of the coils 3 and 4 produced by the adjustments of the vane 9. A third factor is the proper tuning of the cathode coil circuit and of the anode coil circuit of the apparatus. The fourth factor is a relatively high time constant for the combination of the resistor I and condenser 2 of Fig. 1.

I have found it impossible to attain the "snap action" and the small dead spot width illustrated by the curve H of Fig. 4, with a vane controller of the character shown in Figs. 1, 2 and 3, unless the cathode coil circuit and the anode coil circuit of Fig. 1 have suitably related frequencies. Thus when the vane controller circuit is of the form shown in Fig. 1, and has the circuit element values hereinbefore stated by way of example, the ratio R of the tuned or resonant frequency of the cathode coil circuit to the tuned or resonant frequency of the anode coil circuit, must be about 1.3 for operation with a dead spot width, or vane movement of only 0.002 of an inch. Thus, if the resonant frequency of the anode coil circuit is approximately 30 megacycles, as may well be the case, the resonant frequency of the cathode coil circuit required for a dead spot width of 0.002 of an inch will ordinarily be between 38 and 42 megacycles.

The fact that the frequency ratio giving a particular small dead spot width may be a little less than 1.3 with one vane controller and a little more than 1.3 with a vane controller which appears to be a duplicate of the first mentioned controller, results in part at least from differences in the Q value, or quality factor, of one or both of the anode coil and cathode coil circuits of the controller. When the Q value of either of those circuits is increased, the ratio R for the circuits must similarly be increased if the dead spot is to be kept at constant width. It seems possible, also, that if the L/C ratio of the cathode coil circuit is increased, the ratio of the cathode coil circuit frequency to the plate coil circuit frequency must be correspondingly increased to keep the dead spot width constant.

Figure 5:
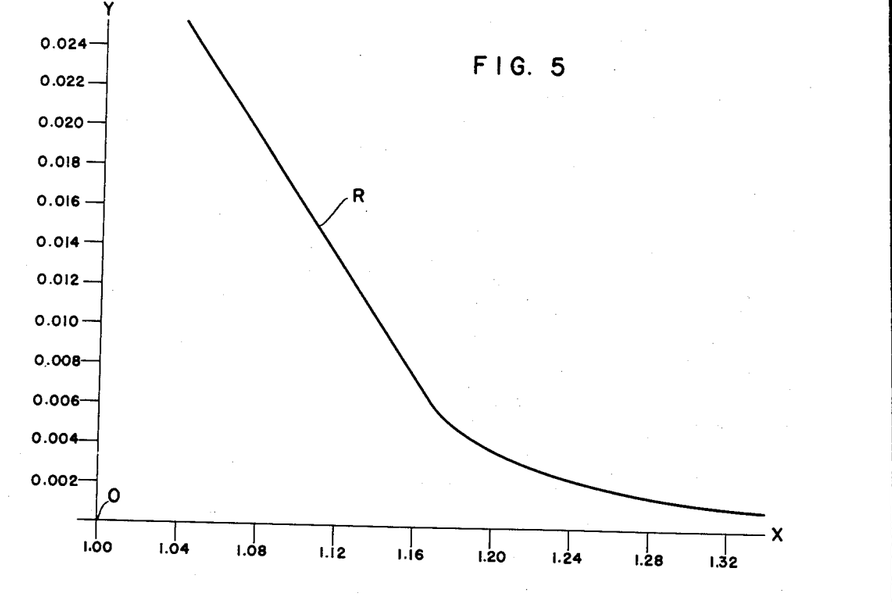
Fig. 5 is a diagram illustrating operative effects of variations in the ratio of the resonant frequencies of the cathode coil and plate coil circuits of Fig. 1.
Figure 6:
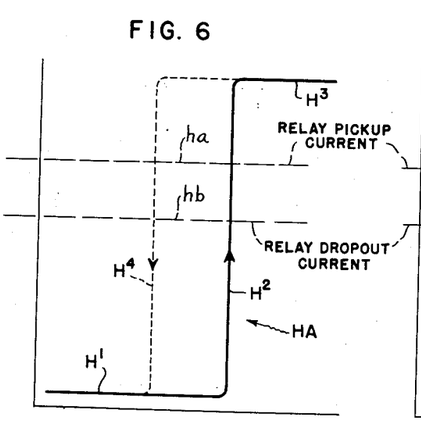
Figs. 6 and 7 illustrate plate current variations in the circuit shown in Fig. 1 produced by variations in the cathode coil and anode coil resonant frequencies.
Figure 7:
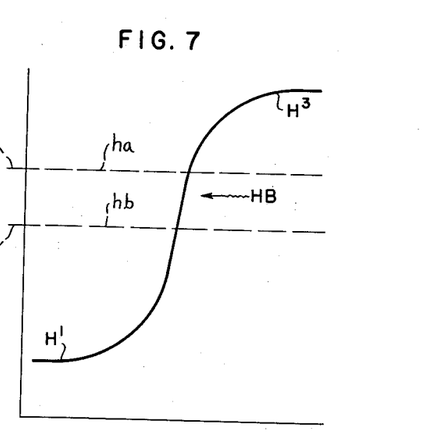

The general manner in which the dead spot width of a particular vane controller of the type shown in Fig. 1, and having the circuit element values hereinbefore mentioned, varies as the frequency ratio R is varied, is illustrated by the curve R of Fig. 5, wherein distances measured along the line OX are values of said frequency ratio R, and distances measured along the vertical line OY are dead spot widths. As the Fig. 5 curve indicates, an increase in the frequency ratio R from about 1.04 to about 1.17 decreases the dead spot width in approximately linear proportion with the ratio change, from a value of about .025 of an inch to a value of about .006 of an inch. As the frequency ratio continues to increase to about 1.26, the width of the dead spot decreases at a progressively decreasing rate to .002 of an inch. A further increase in the frequency ratio to about 1.36 will cause the "snap action" to disappear. The curve H of Fig. 4 illustrates the operation when R has a value of about 1.26 and the dead spot width is .002 of an inch. The curve HA of Fig. 6 illustrates the dead spot width of about .025 of an inch indicated by the curve R and obtained when the frequency ratio R is approximately 1.04, and the curve HB of Fig. 7 illustrates the non-existence of the snap action operation when the frequency ratio R is increased to about 1.36.

In considering the resonant frequencies of the cathode and anode or plate coil circuits, account must be taken of all reactance in each circuit. Thus the reactance of the plate coil circuit of Fig. 1, to be taken into account, comprises the inductance of the coil 4, the distributed capacitance of the coil 4, the capitance between the plate and control grid of the valve A, the capacitance between the socket contacts of the valve A and between those contacts and ground, and the capacitance between the leads connected to the plate coil 4. The resonant frequency of the anode coil circuit of Fig. 1 is equal to $$\frac{1}{2\pi\sqrt{LC}}$$

where L is the inductance of the plate coil 4 and C is the summation of all of the above noted anode coil resonant capacities. The resonant frequency of the cathode coil circuit is also equal to $$\frac{1}{2\pi\sqrt{LC}}$$

when L represents the inductance of the cathode coil 3 and C represents the sum of the various cathode coil capacitances. The latter comprise the distributed capacitance of the coil 3, the capacitance between the cathode and the heater of the tube A, the capacitance between the cathode and metal base of the tube A, the capacitance between the socket contacts of the tube A, and between those contacts and ground, and the capacitance between the leads connected to the cathode coil 3. It is to be noted that any capacitance between the vane 9 and each of the coils 3 and 4 has only a negligible effect on the tuning or operation of the apparatus.

The above-mentioned time constant or time factor is the product of the resistance in ohms of the resistor 1 and the capacity of the condenser 2 of Fig. 1 in farads. With the resistance of the resistor 1 equal to .5 megohm and the capacity of the condenser 2 equal to .015 microfarad, the time constant of the resistance-capacity combination is about 1/133 of a second. As those skilled in the art will recognize, that time constant is higher than is usual with high frequency oscillators.

As already indicated, the use of essential features of the present invention is not limited to control apparatus of the character shown in Figs. 1, 2 and 3. On the contrary, the grounded control grid and cathode coupling features of the tuned plate, tuned cathode oscillator shown in Figs. 1, 2 and 3 may be used with advantage in oscillators characterized by their stability when employed as sources of audio or radio frequency currents and voltages for general use. An oscillator for such use, constructed in accordance with the present invention, may be so proportioned and arranged that its oscillation frequency will be substantially independent of ordinary fluctuations in the supply voltage. Examples of tuned plate, tuned cathode oscillators constructed in accordance with the present invention, for uses other than with vane controllers, are shown in Figs. 8, 9, 10 and 11. The oscillator shown in Fig. 8 differs structurally from the vane controller shown in Figs. 1, 2 and 3 in the omission of the control vane 9, in the form of its anode-cathode circuit, and in the addition of load circuit connections shown at N and N'.

Figure 8:
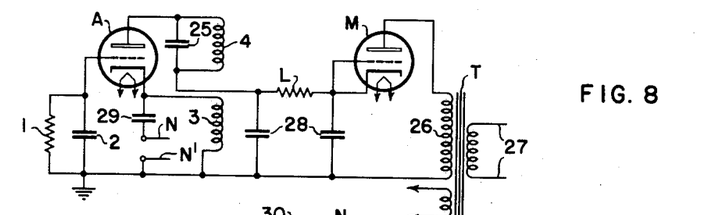
Fig. 8 is a diagram illustrating an oscillator embodiment of the present invention.

In Fig. 8, the anode of the triode valve A, which may be like the valve A of Fig. 1, is connected through the coil 4 and a condenser 25 in parallel therewith to one terminal of a filter resistor L. In Fig. 8, and also in Figs. 9, 10, and 11, the condenser 25 represents the sum of the various capacitances cooperating with the coil 4 to form a resonant anode circuit. The second terminal of the resistor L is connected to the cathode of a rectifier valve M which is connected in series with the anode and cathode of the valve A and with the secondary winding 26 of a transformer T. The primary winding 27 of the transformer T may be connected to any available source of alternating current of low frequency, for example 60 cycles per second. The valve M is shown as a triode, but has its cathode and grid directly connected together so as to operate as a diode rectifier. The terminals of the resistor L are connected to ground through filter condensers 28. The cathode of the valve A is connected to ground through a coil 3 which is in inductive relation with the anode coil 4 as in Fig. 1.

The oscillator shown in Fig. 8 is adapted for stable operation at a high frequency fixed by the resonant frequency of the circuit comprising the coil 4 and condenser 25. The frequency ratio of the cathode and anode circuits of the stable oscillator shown in Fig. 8 is not critical. When the type of oscillator shown in Fig. 8 is to be used in a vane controller, the ratio of the resonant frequency of the cathode coil circuit to the resonant frequency of the anode coil circuit should be about 1.3 when the circuit inductances and capacitances have the same values given above for the circuit arrangement shown in Fig. 1.

Figure 9:
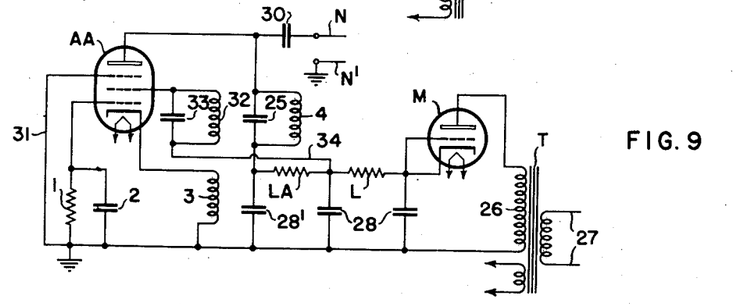
Fig. 9 is a diagram illustrating a modified form of oscillator.

The load or utilizing circuit associated with the stable oscillator shown in Fig. 8 may be coupled to the cathode end of the coil 3 as shown in Fig. 8, where N represents a terminal of the load circuit which is connected to the cathode of the valve 8 through the condenser 29, and N' represents the second terminal of the load circuit which is connected to ground. Alternatively, the terminal N of the load circuit may be coupled to the anode of the stable oscillator through a condenser 30 as is shown in Fig. 9. Instead of capacitively coupling the load circuit to the cathode or anode of the oscillator, as is shown in Figs. 8 and 9, respectively, the load circuit may be inductively coupled to the plate or cathode coil of the oscillator. The valves M and A of Fig. 8 are connected to form a series fed oscillating circuit, whereas in Fig. 1, the battery 5 is associated with the inductances 4 and 8 to form a shunt fed oscillator circuit. The shunt fed oscillator circuit of Fig. 1 may be made to produce stable oscillation by the proper choice of the values of the elements 1 and 2 in the ground connection to the control electrode of Fig. 1, just as the series fed oscillation circuit of Fig. 8 may be made to produce stable oscillations by a proper choice of the values of the elements 1 and 2 of Fig. 8.

I have discovered that, in order to cause the oscillators of Fig. 8 and Fig. 1 to produce stable oscillations in spite of supply voltage fluctuations, it is necessary to make the time constant of the combination of condenser 2 and resistor 1 substantially equal to the reciprocal of the frequency to which the anode circuit is resonant. As an example, if the inductance and capacitance associated with the anode circuit of the triode A of Fig. 8 are of such value that this anode circuit is tuned to a resonant frequency of approximately 1000 kilocycles, the RC or time constant of the parallel-connected resistor 1 and condenser 2 should be substantially equal to 1/1,000,000, if stable oscillations are to be had. As those skilled in the art will instantly recognize, this value for the grid circuit time constant is very small compared with that which would ordinarily be used with conventional oscillators of the prior art.

The triode A of Figs. 1 and 8 is replaced in Fig. 9 by a pentode AA. The cathode of the valve AA is connected to ground through a coil 3, and the control grid of the valve AA is connected to ground through a condenser 2 and a resistor 1 as in Fig. 8. The pentode AA of Fig. 9 has its suppressor grid connected to ground by a conductor 31 and has its screen grid connected to one terminal of a resonant circuit comprising an inductance 32 and a condenser 33 in parallel with said inductance. The second terminals of the inductance 32 and condenser 33 are connected through a conductor 34 to one terminal of the filter resistance L which has its other terminal connected to the cathode of the rectifier valve M. The junction point of the conductor 34 and filter resistance L is connected to ground through one of the filter condensers 28. The cathode of the valve M of Fig. 9 is connected to the anode of the valve AA through the resistor L, a second filter resistor LA, and coil 4 and condenser 25, these latter being respectively similar to the coil 4 and condenser 25 through which the resistor L of Fig. 8 is directly connected to the anode of the valve AA. The connected terminals of the resistor LA, coil 4 and condenser 25 of Fig. 9 are connected to ground through a filter condenser 28'.

The oscillator of Fig. 9 is of the electron coupled type, wherein the screen grid of the tube AA serves as the oscillator anode and is connected to the oscillator plate coil circuit, which includes the coil 4 and condenser 25, through the coil 32 and condenser 33 and through the conductor 34 and filter resistor LA. The resonant circuit comprising the coil 4 and condenser 25 may be tuned to the resonant frequency of the resonant circuit comprising the coil 32 and condenser 33, or to a multiple of that frequency. As previously noted, the terminal N of the load circuit is connected through a condenser 30 to the anode of the valve AA, but may be inductively coupled to the coil 4.

A main advantage of an electron coupled oscillator is that its stability is not significantly affected by changes in the magnitude of the output supplied to the load circuit, and its stability is obtained as a result of the fact that the load current is independent of the oscillator anode circuit including the coil 32 and condenser 33. It is to be noted, however, that the connection of the load circuit to the cathode of the oscillator valve through the condenser 29, as shown in Fig. 8, is advantageous as the impedance of the cathode circuit is low so that the oscillator output is stable with varying loads. In the case of an electron coupled oscillator as shown in Fig. 9, the load circuit may well be connected to the anode circuit since such an oscillator inherently provides stable oscillation with various loads.

Figure 10:
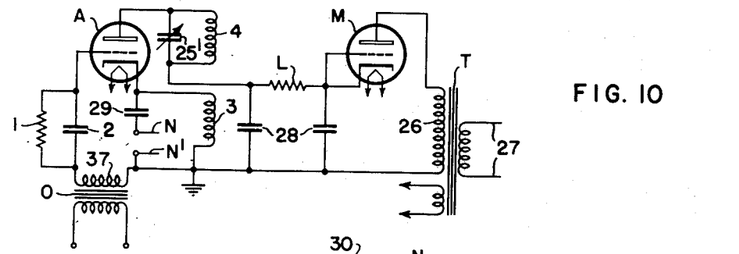
Figs. 10 and 11 are diagrams illustrating the adaptation for modulation of the oscillators shown in Figs. 8 and 9, respectively.
Figure 11:
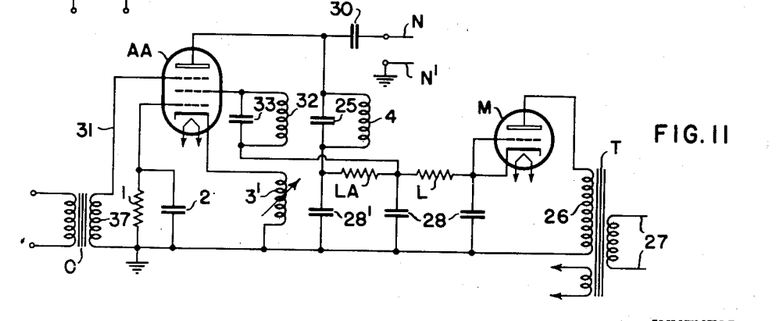

The stable oscillators shown in Figs. 8 and 9 are adapted for a wide variety of uses in which stable oscillations are needed. In particular they are well adapted for use in radio transmission systems of the amplitude modulation type in which the modulating voltage is supplied by a transformer and is varied in amplitude as a function of the intelligence to be transmitted. In Fig. 10 I have illustrated the association of a modulation transformer O with the oscillator system shown in Fig. 8, and in Fig. 11 I have illustrated the use of the modulation transformer O with an oscillator of the type shown in Fig. 9. In Fig. 10, the secondary winding 37 of the transformer O has one terminal connected to ground and has its other terminal connected to the control grid of the valve A through the condenser 2 and the resistor 1 in parallel with said condenser. In Fig. 11, the secondary winding 37 of the modulation transformer O has one terminal connected directly to ground and has its other terminal connected to the suppressor grid of the valve AA through the conductor 31.

The modulated oscillators shown in Figs. 10 and 11 appear to have no particular value as vane controllers but each is of value as a source of modulated oscillations of a frequency confined to an envelope having the frequency of the modulation voltage supplied by the transformer O. Such modulated oscillations are used, for example, not only in radio transmission systems, but also in measuring and control systems including variable frequency oscillators and frequency discriminators. One example of the last mentioned system type is shown in the Wild application, Serial No. 537,505, filed May 26, 1944, now Patent No. 2,532,872 of December 5, 1950. The frequency of oscillation of such an oscillator as is shown in Fig. 10 or 11 may be varied by varying the inductance or capacitance of the anode or cathode circuit of the oscillator. Thus for example, the fixed condenser 25 of Fig. 8 may be replaced in Fig. 10 by a variable condenser 25', and in Fig. 11 the fixed inductance coil 3 of Fig. 9 is replaced by a variable inductor 3'. As will be apparent, the output frequency of the electron coupled oscillator shown in Fig. 9 can be made variable by making any one or more of the circuit elements 4, 25, 32 and 33 a variable element, as well as by replacing the fixed inductor 3 of Fig. 9 by a variable inductor 3' as shown in Fig. 11. In all of the forms of the invention illustrated herein, the grounding of the control grid serves the purpose of isolating the plate and cathode circuits so that the internal coupling is reduced to a minimum.

The general principles of the present invention may be used with advantage in known oscillation control systems differing widely in form from the system shown in Fig. 1. The principles of the present invention are also used with advantage in improved oscillation control systems devised by Wm. H. Wannamaker and disclosed in his application, Serial No. 694,401, filed August 31, 1946, now Patent No. 2,564,937 of August 21, 1951.

The present application is a continuation in part of my prior application, Serial No. 694,399, filed August 31, 1946, now abandoned.

While in accordance with the provisions of the statutes I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A tuned anode, tuned cathode oscillator comprising an electron discharge device having an output circuit including an anode and a cathode and including an inductance directly connected to said anode and including capacity cooperating with said inductance to form a resonant anode circuit, and an input circuit including a control electrode maintained at a substantially fixed potential and including said cathode and including a second inductance directly connected to said cathode and in mutual inductive relation with the first mentioned inductance and also including capacity cooperating with said second inductance to form a resonant cathode circuit, in which the inductances and capacities are so related that the respective resonant frequencies of the cathode and anode circuits are in the ratio of about 1.3 to 1.

2. A tuned anode, tuned cathode oscillator comprising an electron discharge device having an output circuit including an anode and a cathode and including an inductance directly connected to said anode and including capacity cooperating with said inductance to form a resonant anode circuit, and an input circuit including a control electrode maintained at a substantially fixed potential and including said cathode and including a second inductance directly connected to said cathode and in mutual inductive relation with the first mentioned inductance and also including capacity cooperating with said second inductance to form a resonant cathode circuit, and in which the inductances and capacities are so related that the resonant frequency of the cathode circuit is greater than the resonant frequency of the anode circuit by more than twenty percent and less than fifty percent.

3. A tuned anode, tuned cathode oscillator comprising an electron discharge device having an anode, a cathode and control and screen grids and having an output circuit including said anode and said cathode and also including a first inductance having one terminal directly connected to said anode and capacity cooperating with said inductance to form a resonant anode circuit, and an input circuit including a control electrode maintained at a substantially fixed potential and including a second inductance having one terminal directly connected to said cathode and also including capacity cooperating with said second inductance to form a resonant cathode circuit, a third inductance having one terminal directly connected to said screen grid, and capacity cooperating with said third inductance to form a third resonant circuit, said third inductance being in mutual inductive relationship with said second inductance.

4. An oscillator as specified in claim 3, and a load circuit connected to said one terminal of one of said inductances.

JAMES C. MOUZON.

References Cited in the file of this patent

UNITED STATES PATENTS

| Number | Name | Date |
| --- | --- | --- |
| 1,874,222 | Barbulesco | Aug. 30, 1932 |
| 1,931,338 | Wheeler | Oct. 17, 1933 |
| 1,991,970 | Whitaker et al. | Feb. 19, 1935 |
| 2,022,067 | Wheeler | Nov. 26, 1935 |
| 2,034,433 | Heintz | Mar. 17, 1936 |
| 2,234,184 | MacLaren | Mar. 11, 1941 |
| 2,278,159 | Wheeler | Mar. 31, 1942 |
| 2,284,372 | Crosby | May 26, 1942 |
| 2,393,656 | Royden | Jan. 29, 1946 |
| 2,411,247 | Cohen | Nov. 19, 1946 |
| 2,416,319 | Hotine | Feb. 25, 1947 |
| 2,467,736 | George | Apr. 19, 1949 |
| 2,505,577 | Rich | Apr. 25, 1950 |